(12) United States Patent
Hotto et al.

(10) Patent No.: US 7,208,897 B2
(45) Date of Patent: Apr. 24, 2007

(54) MOTION CONTROL SYSTEM FOR BARRIER DRIVE

(75) Inventors: Robert Hotto, Carlsbad, CA (US); Paul D. Kahn, San Diego, CA (US); Lambert A. Ling, Encinitas, CA (US)

(73) Assignee: Linear Corporation, Carlsbad, CA (US)

( * ) Notice: Subject to any disclaimer, the term of this patent is extended or adjusted under 35 U.S.C. 154(b) by 0 days.

(21) Appl. No.: 11/073,067

(22) Filed: Mar. 4, 2005

(65) Prior Publication Data

US 2006/0197481 A1 Sep. 7, 2006

(51) Int. Cl.
*G05D 3/00* (2006.01)

(52) U.S. Cl. .................. 318/466; 318/445; 318/286; 318/369; 318/396; 318/18

(58) Field of Classification Search ............... 318/466, 318/445, 18, 286, 369, 396, 461, 282; 49/26, 49/28
See application file for complete search history.

(56) References Cited

U.S. PATENT DOCUMENTS

| | | | | |
|---|---|---|---|---|
| 4,851,744 A * | 7/1989 | Kotzur et al. ............... | 388/815 |
| 5,334,922 A * | 8/1994 | Manini ....................... | 318/772 |
| 5,770,934 A * | 6/1998 | Theile ......................... | 318/469 |
| 5,789,887 A * | 8/1998 | Elischewski ................ | 318/468 |
| 6,025,785 A | 2/2000 | Farris et al. ............ | 340/825.31 |
| 6,084,450 A * | 7/2000 | Smith et al. ................. | 327/172 |
| 6,111,374 A | 8/2000 | Fitzgibbon et al. ......... | 318/282 |
| 6,114,825 A * | 9/2000 | Katz .......................... | 318/615 |
| 6,172,475 B1 | 1/2001 | Fitzgibbon et al. ......... | 318/266 |
| 6,184,641 B1 | 2/2001 | Crimmins et al. .......... | 318/466 |
| 6,229,276 B1 | 5/2001 | Fitzgibbon et al. ......... | 318/565 |
| 6,239,569 B1 | 5/2001 | Fitzgibbon et al. ......... | 318/480 |
| 6,246,196 B1 | 6/2001 | Fitzgibbon et al. ......... | 318/430 |
| 6,278,249 B1 | 8/2001 | Fitzgibbon et al. ......... | 318/268 |
| 6,281,650 B1 * | 8/2001 | Yutkowitz ................... | 318/561 |
| 6,340,872 B1 | 1/2002 | Fitzgibbon et al. ............ | 318/9 |
| 6,417,637 B2 | 7/2002 | Fitzgibbon et al. ......... | 318/459 |
| 6,456,022 B1 | 9/2002 | Fitzgibbon et al. ......... | 318/162 |
| 6,528,961 B1 | 3/2003 | Fitzgibbon et al. ......... | 318/283 |
| 6,541,930 B1 * | 4/2003 | Gutierrez .................... | 318/437 |
| 6,541,936 B2 * | 4/2003 | Viti ............................ | 318/727 |
| 6,573,678 B2 | 6/2003 | Losey et al. ................ | 318/470 |
| 6,597,138 B2 | 7/2003 | Fitzgibbon .................. | 318/434 |
| 6,670,725 B2 | 12/2003 | Fitzgibbon et al. ........... | 307/66 |
| 6,683,431 B2 | 1/2004 | Fitzgibbon et al. ......... | 318/468 |
| 6,683,494 B2 * | 1/2004 | Stanley ........................ | 330/10 |
| 6,697,685 B1 * | 2/2004 | Caldwell ..................... | 700/71 |
| 6,710,560 B2 | 3/2004 | Fitzgibbon et al. ......... | 318/264 |
| 6,720,747 B1 | 4/2004 | Fitzgibbon et al. ......... | 318/266 |
| 6,727,673 B2 * | 4/2004 | Atmur ......................... | 318/619 |
| 6,737,821 B1 | 5/2004 | Fitzgibbon et al. ......... | 318/280 |
| 6,737,968 B1 | 5/2004 | Ergun et al. ................. | 340/540 |
| 6,741,052 B2 | 5/2004 | Fitzgibbon .................. | 318/434 |

(Continued)

*Primary Examiner*—Rita Leykin
(74) *Attorney, Agent, or Firm*—Hogan & Hartson LLP

(57) ABSTRACT

A system for operating a barrier system such as a garage door, gate or fence. A DC motor is connected to and operates a barrier drive. A power amplifier is configured to receive power signals from a power supply and to output modulated DC signals to the DC motor. A controller implements an intelligent closed-loop motion control algorithm to control the power amplifier according to a non-linear motion profile. A feedback sensor provides status signals to the controller to determine position or speed of the barrier.

17 Claims, 5 Drawing Sheets

U.S. PATENT DOCUMENTS

| | | |
|---|---|---|
| 6,744,231 B2 | 6/2004 | Fitzgibbon et al. ......... 318/286 |
| 6,751,909 B2 * | 6/2004 | Ranaudo ...................... 49/506 |
| 6,882,121 B2 | 4/2005 | Herke et al. .................. 318/66 |
| 6,922,029 B2 * | 7/2005 | Fuse .......................... 318/254 |
| 6,975,087 B1 | 12/2005 | Crabill et al. ............... 318/590 |
| 7,030,694 B2 * | 4/2006 | Jonkman ..................... 330/251 |
| 7,071,640 B2 * | 7/2006 | Kurosawa et al. .......... 318/254 |
| 2003/0057905 A1 | 3/2003 | Fitzgibbon ................... 318/375 |
| 2003/0205980 A1 | 11/2003 | Fitzgibbon et al. ......... 318/468 |
| 2004/0021437 A1 * | 2/2004 | Maslov et al. ............... 318/254 |
| 2004/0056621 A1 | 3/2004 | Fitzgibbon et al. ......... 318/445 |
| 2004/0124992 A1 | 7/2004 | Pulis et al. ............... 340/686.1 |
| 2004/0135534 A1 * | 7/2004 | Cullen ........................ 318/609 |

\* cited by examiner

MOTION CONTROL SYSTEM FOR BARRIER DRIVE

BACKGROUND OF THE INVENTION

1. Field of the Invention

The present invention relates to barrier operator systems and, more particularly, relates to a modulated DC motor for controlling the operation of a movable barrier such as a garage door or gate or door with a non-linear motion control profile.

2. Description of Related Art

Barrier operators, such as garage door and gate operators, have become more sophisticated by providing greater user convenience, improvements in operational speed, safety, ease of installation, and decreased noise output. DC motor-based garage door operators have gained user preference in comparison to AC motor based garage door operators due to their quieter operation, increased reliability, and smoother movements.

Along with improved reliability, DC motor-based garage door operators provide an increased operational life, which can be attributed to the reduced stress on the garage door transmission system. DC motor-based garage door operators provide a less abrupt, jarring motion during start and stop movements as compared with AC motor-based garage door operators.

Some DC motor-based operators of the prior art attempt to improve motor control by use of a linear speed ramp for opening and closing motions. Prior art operators, for example, may use a linear motion profile based on predetermined speed values. While this is an improvement over full speed start-and stop-type profiles, the profiles of such operators are still not optimal.

Other prior art garage door operators use a DC motor that is pulse width modulated directly off the AC main. The motion control strategy employed by such operators is traditional constant speed on/off control. The motor speed is fixed based on door travel distance.

SUMMARY OF THE INVENTION

The present invention provides a moveable barrier operator system that employs a DC or universal motor and an intelligent closed loop DC controller to optimize barrier motion profiles and improve sensitivity for safety and obstacle detection. The system controller produces a non-linear motion profile and also provides accurate positions to facilitate faster transitions between terminal positions with controlled starting and stopping accelerations.

The system controller of the present invention produces quieter operation and improved reliability by enabling more accurate final positional control with less overshoot or undershoot. This capability of accurate control avoids motion oscillations and chatter caused by impacts and abrupt stops which tend to degrade the mechanical drive train and other physical components of the garage door.

The present invention applies an intelligent closed loop motion control algorithm and a variable switching power amplifier to operate a barrier drive in a non-linear motion profile. Improved motion control optimization, safer operation and increased energy efficiency are provided and maintained during operation of the barrier drive by combined use of intelligent closed loop motion control algorithms and non-linear motion profiles.

In one implementation, a PID algorithm or a continuous self-tuning PID algorithm is used to continuously adjust and optimize operational parameters. In another implementation, a state space control algorithm is used.

The present invention provides improved sensitivity and speed for detecting obstructions, such as the accidental impacting of an automobile or person moving in the drive area of a barrier during operation. This improved detection speed and sensitivity enables the system to quickly take appropriate action to minimize any accidental consequences.

Energy efficiency is becoming a more important feature in barrier operators, as in all new appliances. The U.S. government (EPA) as well as other governments routinely labels consumer appliances with energy efficiency ratings such as "Energy Star" indicative of the relative energy of the particular appliance. The present invention improves energy efficiency by employing smaller, more efficient, and lower cost motors and by providing a DC off line adjustable power amplifier with the ability to output to the motor momentary peak power outputs, which are useful during the start-up operation of the barrier operator.

Accordingly, one embodiment of the invention is a barrier operator system comprising a motor connected to a barrier drive. A controller and a power amplifier implement a closed-loop motion control algorithm to control the motor and the barrier drive according to a non-linear motion profile. The system also comprises an interface for user-initiated input.

Another embodiment of the invention is a barrier operator system comprising a barrier drive and a motor connected to and operating the barrier drive. A power amplifier and direction control circuit are configured to receive power signals from a power source and to output modulated DC signals to the motor. A controller implements a closed-loop motion control algorithm to control the power amplifier and the direction control circuit according to non-linear motion profiles. An interface is provided for user-initiated input, and a feedback sensor provides status signals to the controller to derive position and speed of a barrier.

Another embodiment of the invention is a barrier operator system comprising a barrier drive and a motor connected to and operating the barrier drive. A controller implements closed-loop motion control algorithms to control a power amplifier and a direction control circuit according to motion profiles. The motion profiles include a motion profile segment starting the movement of a barrier and having an over-voltage mode for increased starting torque and quick acceleration.

A further embodiment of the invention is a barrier operator system comprising a DC motor connected to a barrier drive, and a variable switching off-line power amplifier connected between the DC motor and a power source that controls the motor with pulse modulated signals.

Other features, advantages and embodiments of the invention will be apparent from the following detailed description, drawings and claims.

DETAILED DESCRIPTION OF THE INVENTION

Figure 1:
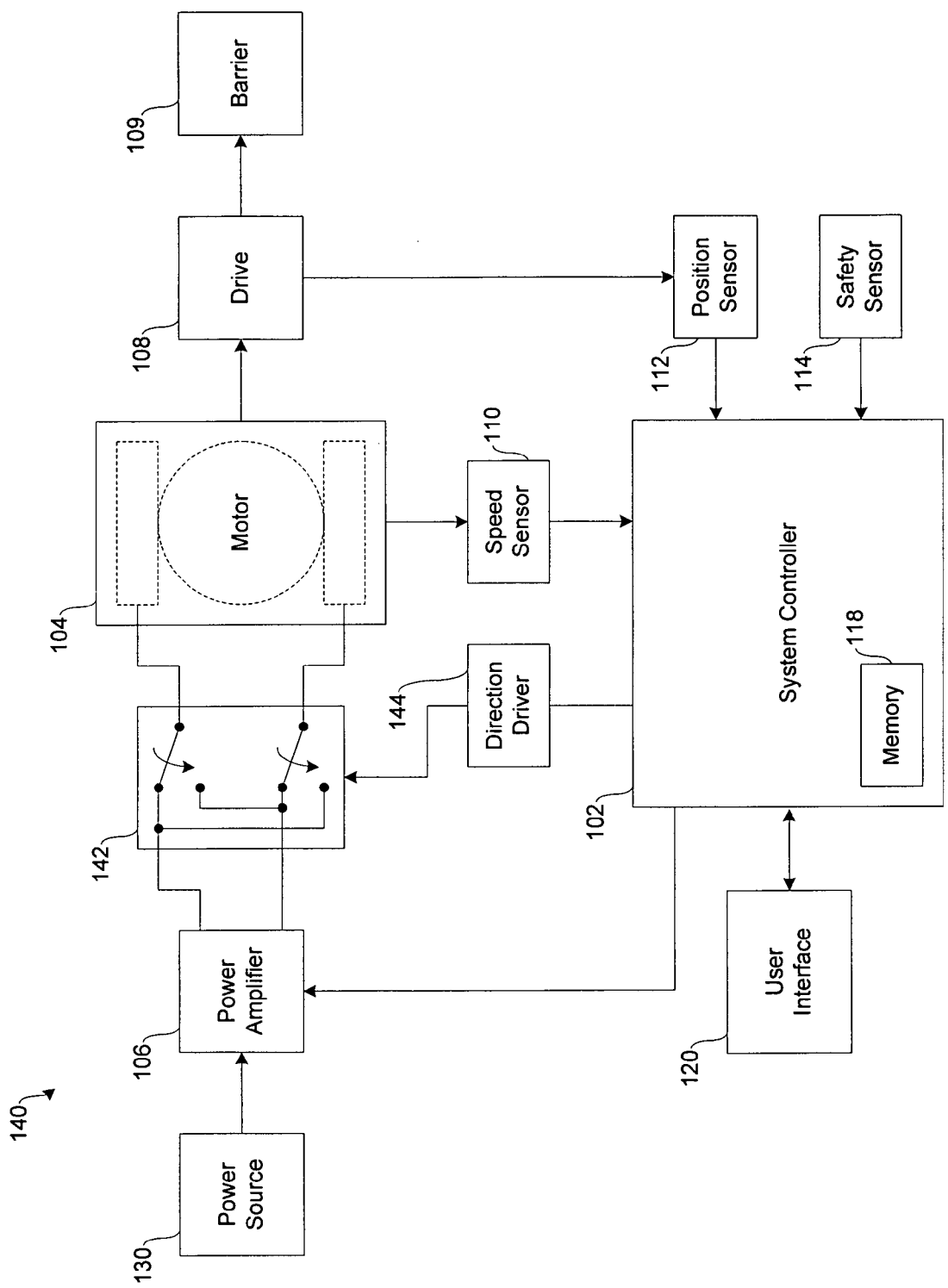
FIG. 1 is a block diagram of a barrier operator system according to the present invention.

FIG. 1 is a block diagram of a barrier operator system 140 according to the present invention. As will be appreciated by those of skill in the art, barrier operator system 140 may control any type of moveable barrier including, without limitation, garage doors, commercial doors, fences and gates. Operator system 140 includes system controller 102, motor 104, power amplifier 106, direction control circuit 142 and direction driver 144, drive 108, speed sensor 110 (optional), position sensor 112, safety sensor 114 and user interface 120.

Operator system 140 comprises, in one embodiment, a barrier operator system with a pulse modulated offline DC motor amplifier with closed-loop feedback and intelligent closed-loop motion control algorithms implementing non-linear motion profiles. In one embodiment, power amplifier 106 is a pulse modulated power amplifier that employs pulse width modulation (PWM), pulse height modulation (PHM) or pulse frequency modulation (PFM) for driving a DC motor 104. This is described in greater detail below.

System controller 102 coordinates and manages operator system 140 and provides programmed operation by executing a sequence of commands to motor 104 via power amplifier 106. For example, a barrier opening operation or routine may begin with executing a preprogrammed, non-linear ramp, followed by a slewing motion, followed by a non-linear ramp to slow down the speed of the barrier and bring it to a full stop. System controller 102 may be selected from various computing devices known in the art such as, for example, microcontrollers, DSP controllers and ASIC dedicated controller devices.

System controller 102 comprises, in one embodiment, a microcontroller that is adapted to interface with power amplifier 106 to control motor 104 with a closed-loop motion control algorithm. Examples of closed-loop control algorithms that may be used include, without limitation, proportional-integral-derivative (PID) algorithms, self-tuning PID algorithms and state space algorithms. The closed-loop motion control algorithm is applied in real time to achieve precision control for both motor speed and position. In one embodiment, controller 102 implements a self-tuning PID algorithm that sets P, I and D gain constants to achieve a desired response curve for a barrier based, at least in part, on a predetermined or required damping coefficient, decay ratio, settle time, and frequency response.

The control algorithm executed by system controller 102 regulates the speed of motor 104 along a non-linear motion profile from a start motion terminal position to a stop motion terminal position. Barrier speed is maintained according to a non-linear motion profile along the drive path, which is stored in memory 118. The motion profile is maintained despite variations in holding forces on the drive mechanics cause by changes in friction, holding forces, and other variations in the drive forces caused by, for example, weathering and aging of the drive mechanism.

System controller 102 may receive feedback information from speed sensor 110, position sensor 112, and safety sensor 114. The use of feedback sensors facilitates quicker and more accurate speed and position sensing to improve system control and safety detection. Those of skill in the art will appreciate that a separate speed sensor 110 may not be necessary, since speed can be determined by the change in position as provided by position sensor 112 and elapsed time.

Controller 102 compares sensor feedback information with scheduled position data stored in memory 118 and can thereby determine the status of barrier motion and quickly take any appropriate or necessary action. Controller 102 calculates and provides an appropriate control signal to power amplifier 106 to drive motor 104 at each instant by employing the closed-loop motion control algorithm. As previously described, the control signal may be a PHM, PWM or PFM signal, or a combination of these signals. After comparing information, controller 102 produces current tracking error data, which is inputted into the control algorithm along with the next control command.

Memory 118 stores opening and closing routines for opening and closing a garage door or other barrier, current and previous positions of the barrier, and other system data and software. Memory 118 may store, for example, appropriate software modules for interpreting sensing signals received from sensors 110, 112 and 114. In one embodiment, memory 118 is integral to system controller 102 and comprises one or more memory modules such as random access memory (RAM), read-only memory (ROM), flash memory or other known memory constructs. Alternatively, memory 118 may be external to controller 102.

In one implementation, motor 104 is a DC motor. One example of a suitable DC motor is a 24 volt DC permanent magnet brush-type motor with a front end gear head, such as a series 0278 (SW2L) manufactured by Valeo Corporation. Improved energy efficiency is achieved by employing a smaller, more efficient and lower cost motor and, in combination, by providing power amplifier 106 with the ability to output momentary peak power outputs employing pulse modulation such as PWM, PHM, PFM, or a combination thereof. Such peak power outputs are useful during startup to provide an over-voltage function to begin barrier motion. Power amplifier 106 is described in greater detail below.

Motor 104 is mechanically connected to drive 108 to provide a drive force to drive 108 in a direction to open or close a barrier 109, such as a garage door. A garage door or other barrier 109 is not illustrated in detail in the drawings, but the connection of a drive to open or close a barrier is well known to those of ordinary skill in the art. Drive 108 is connected to open barrier 109 when motor 104 operates in a first direction and to close barrier 109 when motor 104 operates in a second direction. Drive 108 comprises, in one embodiment, a mechanical power distribution system, such as a drive chain system, a belt drive system or a screw drive system. The position of drive 108 is determined by system controller 102 by accumulating a count from position sensor 112.

Power amplifier 106 is controlled by system controller 102 to deliver power to motor 104. Power amplifier 106 is a variable voltage switching power amplifier that provides pulse modulated power signals to motor 104 upon actuation by system controller 102. Power amplifier 106 is adapted to interface with a power source 130, such as, for example, an AC (alternating current) electrical outlet via a power cord. This off-line connection, without a front end transformer, enables system controller 102 to provide control signals to power amplifier 106 to thereby increase voltage output to motor 104 and to provide for a peak impulse voltage during startup operation of motor 104 without the constraints imposed by a conventional transformer based power amplifier. In one embodiment, power amplifier 106 is connected off-line in this manner is capable of providing a peak over voltage output of, for example, 30 volts for a brief start period. This is referred to herein as an "over-voltage" period and can be provided without the costs incurred by continuous power dissipation at the 30 volt level imposed by a conventional fixed front end power amplifier configuration.

During operation, power amplifier 106 receives electrical power from power source 130 and control signals from system controller 102, and outputs modulated power signals to motor 104 to operate and control the speed of motor 104. The modulated signals may be PWM, PHM or PFM signals. As described above, in one embodiment, power source 130 is an off-line power source, such as an AC electrical outlet. In such an embodiment, power amplifier 106 converts the AC power signal to a DC power signal, which is modulated and supplied to DC motor 104 in accordance with the control signals from controller 102. Alternatively, power source 130 could be a DC power source such as a battery.

Direction control circuit 142 is interposed between power amplifier 106 and motor 104. Direction control circuit 142 receives a power amplifier voltage from power amplifier 106 and, depending on the control signal from controller 102, provides the received voltage to motor 104. Controller 102 controls the direction of motor 104 via direction control circuit 142 to control the travel direction of the barrier. Controller 102 controls direction control circuit 142 to provide motor 104 with power from power amplifier 106 having a polarity corresponding to the applied control signal. In one embodiment, direction control circuit 142 is a double pole relay configured in an H-Bridge type format so that current from power amplifier 106 is directed to motor 104 to open or close the barrier.

Direction control circuit 142 includes selectable switching elements that switch the polarity of motor 104 to allow forward or reverse operation for opening or closing the barrier. A first control signal received from controller 102 may indicate that the switching elements of control circuit 142 should be switched to a first position so that motor 104 rotates in a first direction, such as a forward direction; and a second control signal may indicate that the switching elements of relay 142 should be switched to a second position, opposite the first position, so that motor 104 rotates in a second direction, such as a reverse direction.

Direction driver 144 is interposed between system controller 102 and direction control circuit 142. Direction driver 144 operates the switching elements of direction control circuit 142 based on control signals received from system controller 102.

Speed sensor 110 is connected to receive status signals from motor 104 and send feedback signals to system controller 102. Speed sensor 110 senses the speed of motor 104 and relays feedback signals to system controller 102 corresponding to the sensed speed. Sensor 110 also generates status signals indicative of variations in the speed and drag of motor 104 during operation. The speed and drag of motor 104 is influenced by variations in holding forces acting on motor 104 during operation. System controller 102 receives feedback signals from speed sensor 110 and regulates the operation of motor 104 to compensate for variations in the speed and drag of motor 104 during motion along the drive path.

In some embodiments, an independent speed sensor 110 may not be employed, since speed can be determined from feedback provided by position sensor 112 (described below) along with elapsed time. Thus, speed sensor 110 is optional.

Position sensor 112 is connected to receive status signals from drive 108 and send feedback signals to system controller 102. Position sensor 112 senses the position of the barrier and relays position signals corresponding to sensed positions to system controller 102. The position of the barrier may be sensed relative to open or closed positions. After determining the position of the barrier, position sensor 112 sends a position signal relating to the sensed position of the barrier to system controller 102. Once received, the current position of the barrier is stored in memory 118 and accessed by system controller 102 during operation. If the barrier is closed, for example, position sensor 112 relays a closed position signal from drive 108 to system controller 102. Position sensor 112 may have a plurality of inputs for sensing a plurality of positions along the drive path of the barrier. These positions may include terminal positions, such as open and closed positions, as well as other positions between the terminal positions. The sensing of this plurality of positions may be accomplished by use of a rotational sensor, such as a hall-effect or optical encoder.

Speed sensor 110 and position sensor 112 comprise, in one embodiment, an encoder wheel including a quadrature encoder, one or more limit switches, and a back electromotive force (BEMF) sensing circuit. Speed sensor 110 comprises, in another embodiment, a pulse counter that counts the number of revolutions or fractions thereof of motor 104 per unit time. Other generally known speed and position sensors may be utilized in place of those described above without departing from the scope of the present invention.

Safety sensor 114 senses fault or error conditions indicating whether an object is blocking or obstructing the drive path of the barrier. When a fault or error condition is sensed, sensor 114 relays a sensing signal to system controller 102. Safety sensor 114 may comprise, for example, a light beam interruption device. Before executing a user command received from user interface 120, for example, safety sensor 114 determines whether operator system 140 is in a safe operational status by determining whether closure of the barrier is obstructed. System controller 102 may receive a sensing signal from sensor 114 indicating either safe or unsafe operational status. For example, a first sensing signal may indicate that the operational path of the barrier is clear, indicating a safe mode of operation, while a second sensing signal indicates an obstruction in the path of the barrier, indicating an unsafe mode of operation. Thus, controller 102 operates and executes user commands received from user interface 120 only when safe operational status is confirmed.

During operation, when controller 102 receives a sensing signal from sensor 114 indicating a fault or error condition, execution of the current user command is halted and a preprogrammed safety routine is run. The safety routine may be an immediate cessation of motion and, in the case of a closing movement, reversal of the closing movement in compliance with regulatory safety standards.

User interface 120 provides command signals to controller 102. Interface 120 may comprise a user switch or a remote radio transmitter. User control of operator system 140 is initiated from interface 120 to perform operations such as barrier opening, closing and stopping, and continuation of barrier movement after an interrupted movement.

Figure 2:
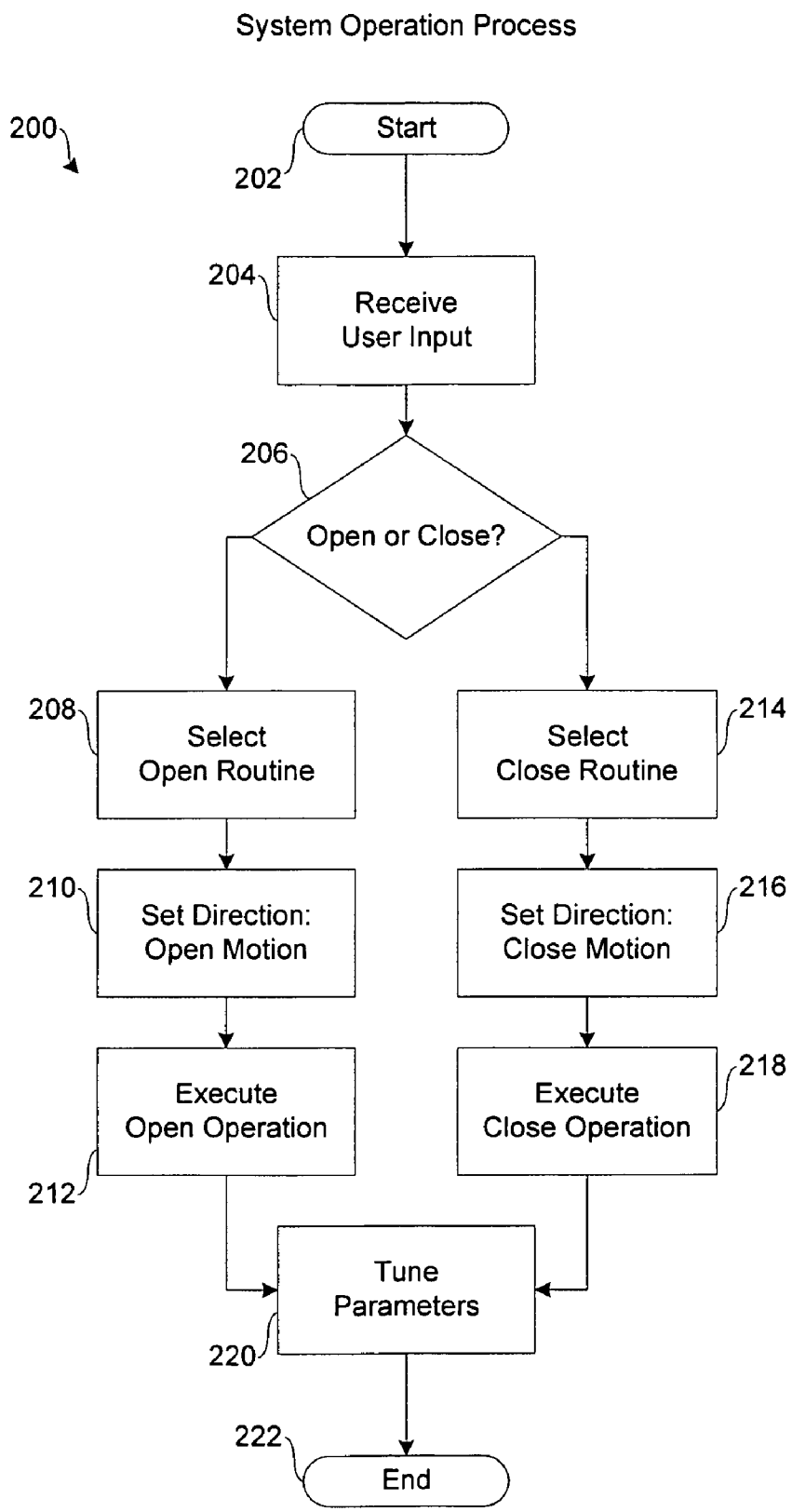
FIG. 2 is a flow diagram of a method for opening and closing a barrier according to the present invention.

FIG. 2 is a flow diagram of a method 200 for opening or closing a barrier. Method 200 begins in start state 202 and proceeds to state 204, where operation is initiated by system controller 102 after receiving a command signal from user interface 120. In decision state 206, controller 102 determines whether to open or close the barrier based, at least in part, on system status information stored in memory 118.

The previous operation and current position of the barrier can be stored in memory 118 and accessed by system controller 102.

In state 208, if an open routine was selected in decision state 206, controller 102 selects an opening motion routine to open the barrier. Then, in state 210, controller 102 sets direction control circuit 142, via direction driver 144, to operate motor 104 in a direction to provide an open motion operation. In state 212, controller 102 executes the opening motion routine and performs the open motion operation to open the barrier. Controller 102 controls power amplifier 106 to provide power to motor 104 via direction control circuit 142 so that motor 104 operates in a direction to open the barrier.

If a close routine was selected in decision state 206 then, in state 214, controller 102 selects a closing motion routine to close the barrier. In state 216, controller 102 sets direction control circuit 142 via direction driver 144 to operate motor 104 in a direction to provide a close motion operation. In state 218, controller 102 executes the closing motion routine and performs the close motion operation to close the barrier. Controller 102 controls power amplifier 106 to provide power to motor 104 via direction control circuit 142 so that motor 104 operates in a direction to close the barrier.

Controller 102 controls direction control circuit 142 to operate motor 104 in either a forward or reverse motion. Once the direction is selected, controller 102 sends a control signal to power amplifier 106 to amplifier power to motor 104 via direction control circuit 142. In one embodiment, this is accomplished by output of a logical high or low control signal from controller 102 to direction driver 144. As illustrated in FIG. 1, direction driver 144 controls the double pole relay of direction control circuit 142 to steer the direction of current flow (polarity) from power amplifier 106 to motor 104 to control the direction of motor 104, which translates to a forward or reverse motion to open or close the barrier.

In state 220, after performing either an open or close operation, controller 102 tunes the parameters of motion. In one embodiment, a self-tuning PID control algorithm is implemented by controller 102. During normal operation, the PID algorithm implemented by controller 102 determines the required voltage to motor 104 based, at least in part, on the error between the present real-time position and the desired real-time position. This error is translated into a pulse modulated control signal (PWM, PHM, PFM or a combination thereof) to produce the required correction to motor 104. Method 200 then terminates in end state 222.

The self-tuning PID algorithm also performs corrections for environmental changes, irregularities in the drive train, and wearing of the drive mechanism, which can affect the operation of system 140. The self-tuning PID algorithm adjusts gain parameters over the operation of the drive mechanism to compensate for variations in drive train resistance, aging and other conditions.

Figure 3:
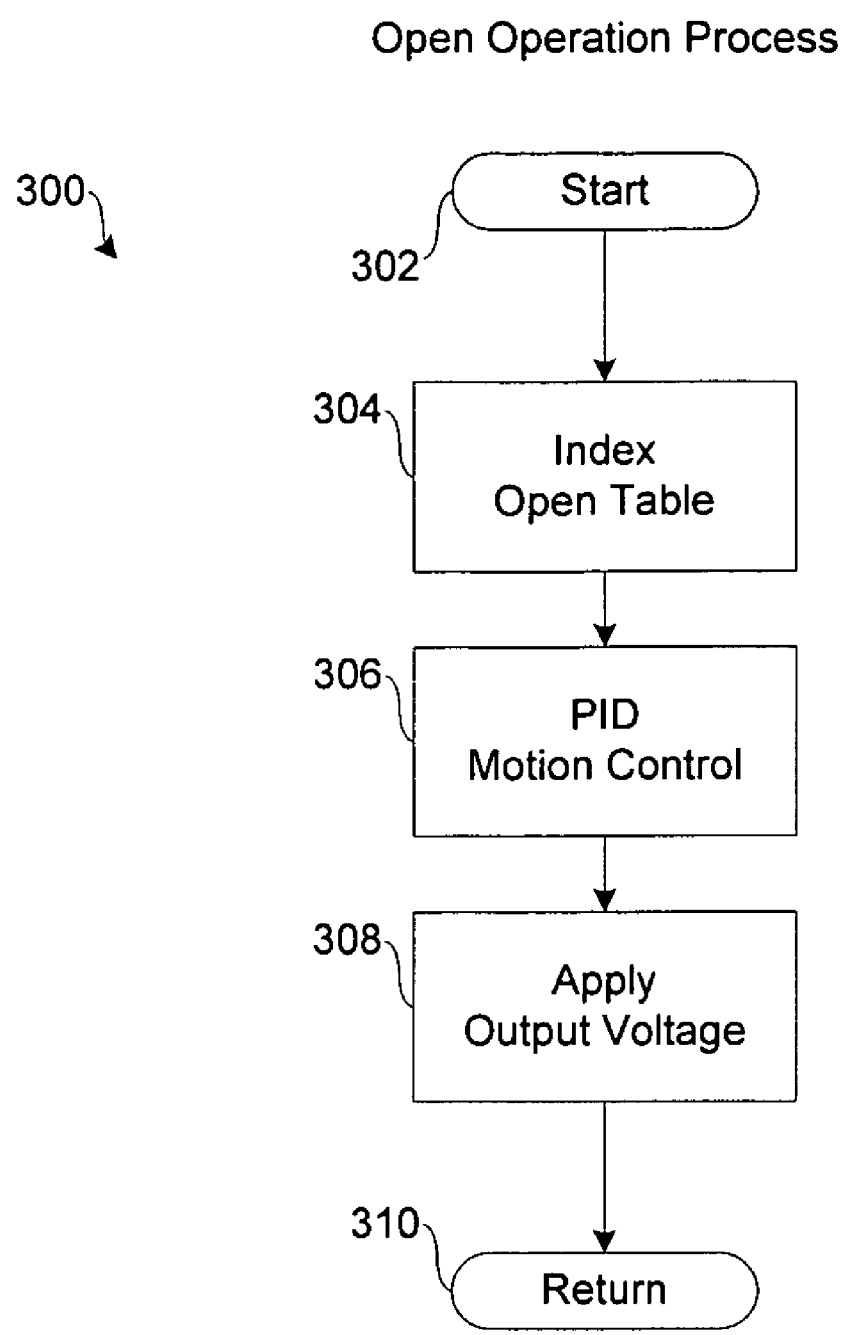
FIG. 3 is a flow diagram of an opening operation process according to the present invention.

FIG. 3 is a flowchart of an open operation process 300 that is called by controller 102 from the execute open operation of state 212 in FIG. 2. Process 300 begins in start state 302 and proceeds to state 304, where an open motion real-time position versus time table stored in memory 118 is indexed to open the barrier. For a closing motion, controller 102 would instead index a close motion real-time position versus time table. Different tables are used for opening and closing motions due to the different speeds and holding force parameters associated with these motions.

The open motion real-time position versus time table may comprise sampled position increments from position sensor 112, such as a quadrature encoder or BEMF sensor, which reads and records into memory 118 at discrete intervals, such as one-millisecond time intervals. This table includes position information with respect to time with each input representing, for example, a millisecond, to thereby provide controller 102 with real-time data to determine whether the barrier drive is at the proper position at each millisecond and the total travel distance required.

In state 306, a motion control routine employing a pre-programmed, non-linear motion profile and command sequence is performed. The output provided by this routine is shown in the speed versus time graph of FIG. 4A and in the voltage versus time graph of FIG. 4B. The motion control routine also employs motion parameters such as gain parameters and calibration data. In one embodiment, a PID motion control algorithm is used.

In state 308, controller 102 outputs control signals to drive motor 104 via power amplifier 106. An example of a voltage versus time motion control sequence for an open motion profile is as follows:

1. On initial power up, the system provides 24 volts for ½ second.
2. To accelerate quickly up to full speed, the system provides 30 volts for the next 2.5 seconds.
3. To maintain a high rate of speed, the system provides output modulation of the pulse width of 19 to 24 volts.
4. At 4 seconds prior to the end of travel, deceleration begins from a present voltage of 24 volts to 8 volts in a non-linear sequence for 3 seconds.
5. In the last 1 second of travel, the system controller decelerates by a voltage slope from 8 volts to 0 volts.

In state 310, process 300 returns to system operation process 200 of FIG. 2.

Figure 4A:
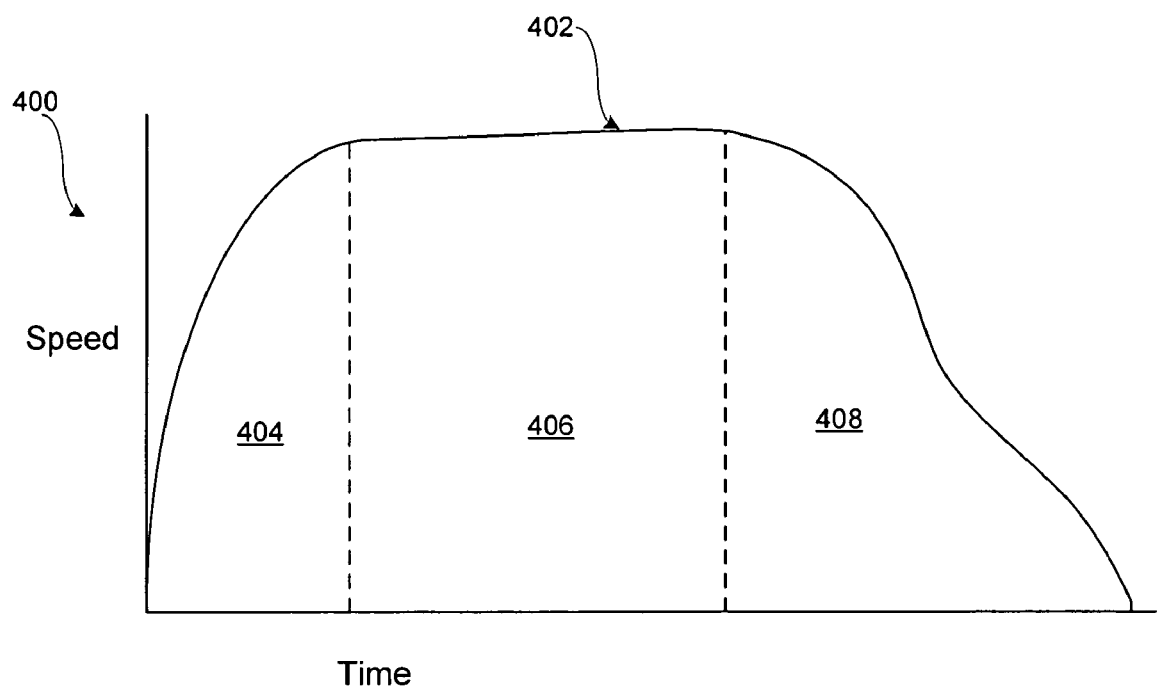
FIG. 4A is a speed versus time chart according to an embodiment of the present invention.

FIG. 4A is a speed versus time chart 400 illustrating one embodiment of a non-linear motion profile 402 as performed by controller 102 with processes 200 and 300 of FIGS. 2 and 3. Motion profile 402 defines an open motion that can be applied to operate a barrier.

As shown in FIG. 4A, the initial acceleration 404 of motor 104 is non-linear and ramps up quickly to a high rate of speed. Following, motor 104 operates in a slew mode 406 with a predetermined speed for a majority of the transition time from the initial closed position of the barrier to a target open position.

The deceleration and stopping at the target open position can be rapid and non-linear, as shown in end portion 408 of the chart in FIG. 4A. In one aspect, a two level non-linear deceleration is executed to provide for a soft stop at the terminal point. Motion profile 402 provides improved transition speed between closed and open positions and can avoid momentum reflections that can cause system oscillations and chatter, which usually occur at the end of travel.

Figure 4B:
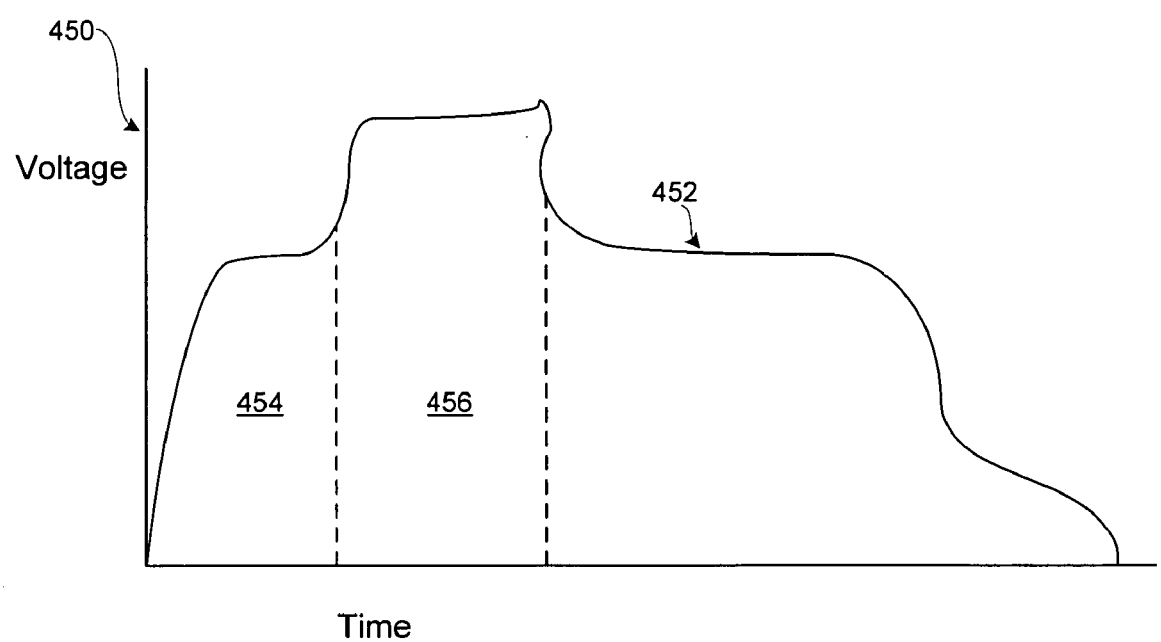
FIG. 4B is a voltage versus time chart according to an embodiment of the present invention.

FIG. 4B is a voltage versus time chart 450 illustrating a voltage output profile 452 that corresponds to motion profile 402 of FIG. 4A. Voltage time chart 450 graphically illustrates voltage output to motor 104. Controller 102 begins by controlling power amplifier 106 to provide, in one embodiment, approximately a 24 volt output signal 454 to power up the windings of motor 104. Next, controller 102 controls power amplifier 106 to provide a high voltage output signal 456 to motor 104 as shown in chart 452. In one embodiment, a 30 volt output signal is applied to motor 104.

Signal 456 is a "kick start" or "over-voltage" operation that quickly accelerates the drive system and provides increased starting torque above what the motor would normally output at its typically rated 24 volts DC. Those skilled in the art will appreciate that barrier systems generally require an initial high starting torque for the barrier to "breakaway" from its closed position. This is due to holding forces, such as static friction, which are significant forces when the barrier is in a closed position prior to being opened to an open position. An additional factor in some barriers is the geometry of the barrier mechanics, which in many cases has the full vectored weight component of the barrier present creating a high load condition during the initial movement.

In general, the "breakaway" torque requirement to open a barrier from a closed position is substantially greater (160–500% greater) than the torque required in other parts of the motion profile. By providing the initial 30 volt output voltage 456 to motor 104, additional torque output is achieved and enables use of a smaller, lower cost, and more efficient motor, since the drive torque required in other parts of the motion profile is much less. The over voltage applied to motor 104 is for a short interval relative to overall operation of motor 104. For a 2.5 second interval, for example, the percentage of over voltage increment above continuous operational voltage is relatively small so that negative effects caused by the over voltage to motor 104 over time will be insignificant.

As previously described in FIG. 2 with reference to state 220, controller 102 maintains the proper control parameters for system operation. This is achieved by computing the required voltage to motor 104 based, at least in part, on the error between the present real-time position and the desired real-time position. The error voltage is converted to pulse width modulation to produce the voltage applied to motor 104.

In one embodiment, controller 102 implements a servo control algorithm that calculates real-time voltage output to motor 104 based on the following parameters with respect to time:

1. Pre-programmed non-linear motion control profile.
2. Feedback from the position sensor.
3. Table of hold forces versus time.

Figure 5A:
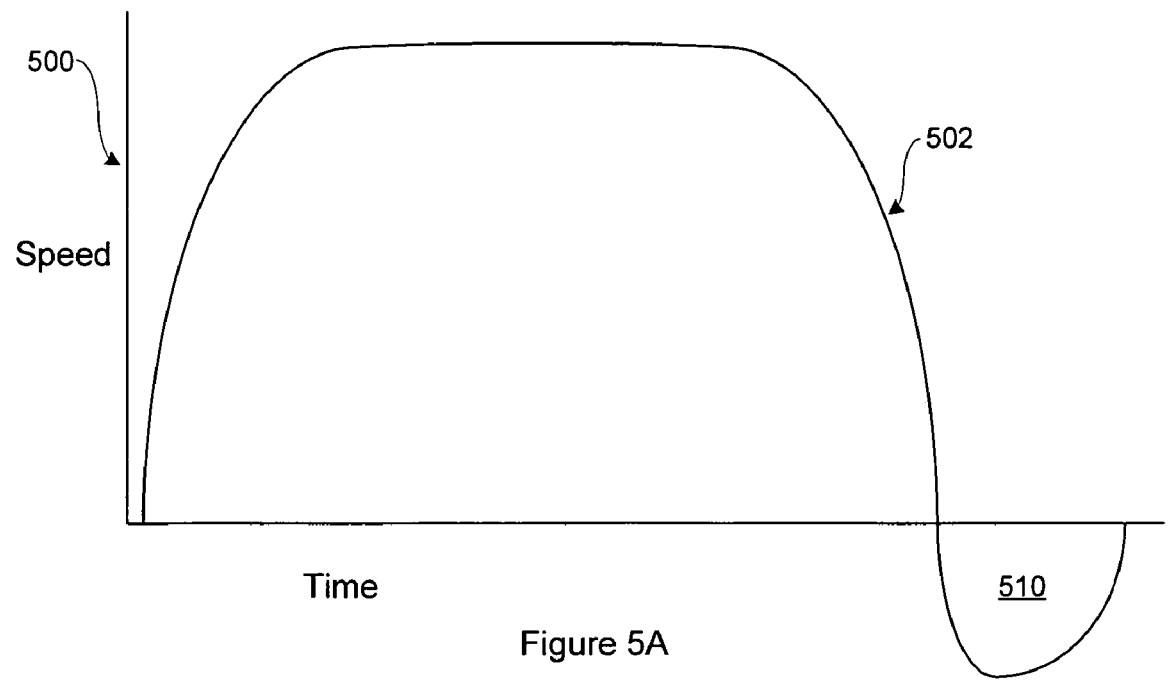
FIG. 5A is a speed versus time chart according to another embodiment of the present invention.

FIG. 5A is a speed versus time chart 500 illustrating a closing operation motion profile 502. In this embodiment, the closing motion profile of the barrier includes a reverse voltage portion such as portion 510 at the end of the closing motion. That is, the voltage polarity is reversed to provide a reverse voltage condition and consequent reverse motor operation, to assist in the stopping motion of the door.

Figure 5B:
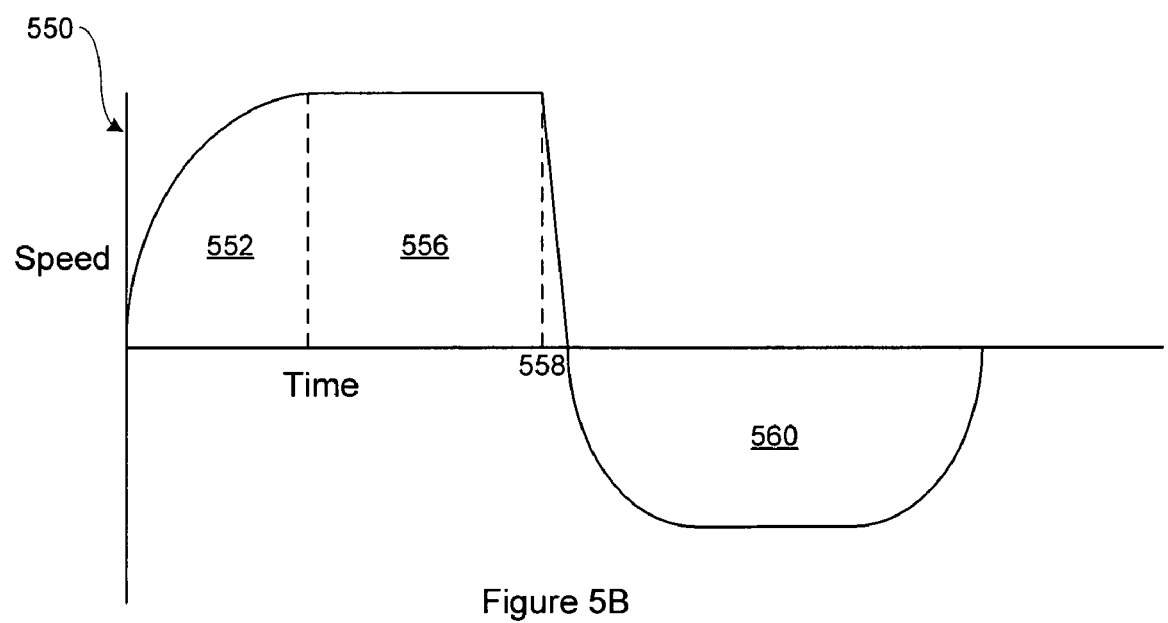
FIG. 5B is a speed versus time chart depicting detection of an obstruction and execution of a safety routine in response.

FIG. 5B is a speed versus time chart 550 depicting the detection of an obstruction and the execution of a preprogrammed safety routine stored in memory 118 when a fault or safety related condition is encountered. Controller 102 executes a non-linear acceleration 552 quickly to a maximum speed for the slewing portion 556 of the move. During slewing motion 556, the barrier encounters an obstruction at time 558. Controller 102 uses the motion control algorithm to detect that the holding forces are above the preprogrammed defined percentage for compensation and immediately reverses direction for portion 560. This is accomplished by controller 102 executing the following preprogrammed sequences:

1. Reversing the control signal to the direction driver 144, as shown in FIG. 2.
2. Controlling power amplifier 106, as shown in FIG. 2, to slope to zero voltage in a preprogrammed ramp.

This execution produces the motion profile of chart 550. As shown in FIG. 5B, the motion reverses direction in section 560 of the profile, and then quickly slows to a stop at a fixed distance prior to the obstacle detection. In one aspect, the motion profile curve is characterized by non-linear starting and stopping accelerations and accurate position control to thereby provide both the fastest and smoothest movement for a garage door, movable door, fence, gate or other barrier.

The improved safety and improved obstruction and resistance detection and avoidance capabilities enable system controller 102 to differentiate problem conditions and to take corrective actions to tune system control parameters to reflect the drive changes. Barrier operator system 140 provides quieter and safer operation with improved energy efficiency and faster, smoother movements between operable positions.

Modification to the particular embodiments of the invention described herein may be made without departing from the spirit and scope of the invention. The described embodiments are illustrative and not restrictive, and the scope of the invention is indicated by the appended claims, rather than the foregoing description. All modifications which come within the meaning and range of equivalency of the claims are therefore intended to be embraced therein.

The invention claimed is:

1. A barrier operator system comprising:
   a barrier drive;
   a motor connected to and operating the barrier drive;
   a power amplifier that drives the motor;
   a sensor that provides feedback in a form of position, direction or speed;
   a controller with memory that stores a predetermined non-linear motion profile for the barrier drive, and that receives the feedback from the sensor and dynamically adjusts a control signal provided to the power amplifier according to the predetermined non-linear motion profile, wherein said motor, power amplifier, sensor and controller implement a closed-loop motion control algorithm to control the barrier drive according to the stored non-linear motion profile; and
   an interface for user-initiated input,
   wherein the non-linear motion profile comprises an opening motion profile comprising:
   an initial over-voltage function to provide increased starting torque and quick acceleration of a barrier;
   a slew function to provide movement at a highest operating speed of the motion profile to open the barrier; and
   a concluding deceleration function to provide a soft stop of the barrier at the fully opened position.

2. A barrier operator system as claimed in claim 1, wherein the barrier drive is configured to drive a barrier selected from a group consisting of a garage door, a commercial door, a gate and a fence.

3. A barrier operator system as claimed in claim 1, wherein:
   the motor is a DC motor, and
   the power amplifier is coupled between the DC motor and the controller and is configured to receive power signals from a power source, to receive control signals from the controller, and to output modulated DC signals to power the DC motor.

4. A barrier operator system as claimed in claim 3, wherein the modulated DC signals are selected from a group consisting of pulse width modulated signals, pulse height modulated signals, pulse frequency modulated signals, and combinations thereof.

5. A barrier operator system as claimed in claim 3, and further comprising a power source that is selected from a group consisting of an AC power line, a DC power source, a battery and combinations thereof.

6. A barrier operator system as claimed in claim 1, wherein the closed-loop motion control algorithm is selected from a group consisting of a PID algorithm, a self-tuning PID algorithm and a state space algorithm.

7. A barrier drive system as claimed in claim 1, wherein the position sensor comprises a quadrature encoder.

8. A barrier operator system as claimed in claim 1, and further comprising:
a speed sensor connected between the motor and the controller, the speed sensor relaying motor speed status signals to the controller.

9. A barrier operator system as claimed in claim 8, wherein the speed sensor comprises a back electro-motive force sensing circuit.

10. A barrier operator system comprising:
a barrier drive;
a motor connected to and operating the barrier drive;
a power amplifier that drives the motor;
a sensor that provides feedback in a form of position, direction or speed;
a controller with memory that stores a predetermined non-linear motion profile for the barrier drive, and that receives the feedback from the sensor and dynamically adjusts a control signal provided to the power amplifier according to the predetermined non-linear motion profile, wherein said motor, power amplifier, sensor and controller implement a closed-loop motion control algorithm to control the barrier drive according to the stored non-linear motion profile; and
an interface for user-initiated input,
wherein the non-linear motion profile comprises a closing motion profile comprising:
an acceleration mode to overcome inertia of a barrier and accelerate movement of the barrier to a predetermined speed;
a slew function to provide movement at a highest operating speed of the motion profile to close the barrier; and
a concluding reverse voltage function to assist in stopping motion of the barrier at the fully closed position.

11. A barrier operator system comprising:
a barrier drive;
a motor connected to and operating the barrier drive;
a power amplifier and direction control circuit;
a sensor that provides feedback in a form of position, direction, speed; and
a controller with memory that stores a predetermined non-linear motion profile for the barrier drive, and that receives the feedback from the sensor and dynamically adjusts a control signal provided to the power amplifier according to the predetermined non-linear motion profile, wherein said motor, power amplifier, sensor and controller implement a closed-loop motion control algorithm to control the barrier drive according to the stored non-linear motion profile,
wherein the non-linear motion profile comprises an open motion profile segment for starting the movement of a barrier including an over-voltage mode for increased starting torque and quick acceleration, and a close motion profile segment for stopping movement of the barrier including a reverse voltage function to assist in stopping the barrier.

12. A barrier operator system comprising:
a DC motor connected to a barrier drive; and
a variable switching off-line power amplifier connected between the DC motor and a power source that controls the motor with pulse modulated signals,
wherein the off-line power amplifier lacks a front end transformer.

13. A barrier operator system as claimed in claim 12, and further comprising:
a controller that controls the variable switching off-line power amplifier according to a closed-loop motion control algorithm and that causes the barrier drive to operate in accordance with a non-linear motion profile.

14. A barrier operator system according to claim 13, and further comprising:
a feedback sensor that provides feedback signals to the controller, the controller adjusting the non-linear motion profile based on the feedback signals.

15. A barrier operator system as claimed in claim 1, wherein:
the motor is a DC motor;
the power amplifier is a variable switching off-line power amplifier connected between the DC motor and a power source that controls the motor with pulse modulated signals; and
the off-line power amplifier lacks a front end transformer.

16. A barrier operator system as claimed in claim 10, wherein:
the motor is a DC motor;
the power amplifier is a variable switching off-line power amplifier connected between the DC motor and a power source that controls the motor with pulse modulated signals; and
the off-line power amplifier lacks a front end transformer.

17. A barrier operator system as claimed in claim 11, wherein:
the motor is a DC motor;
the power amplifier is a variable switching off-line power amplifier connected between the DC motor and a power source that controls the motor with pulse modulated signals; and
the off-line power amplifier lacks a front end transformer.

* * * * *